US007068853B2

(12) United States Patent
Loveridge et al.

(10) Patent No.: US 7,068,853 B2
(45) Date of Patent: Jun. 27, 2006

(54) TONE SCALE ADJUSTMENT OF DIGITAL IMAGES

(75) Inventors: Jennifer C. Loveridge, North Harrow Middlesex (GB); Hani K. Muammar, Northwood (GB)

(73) Assignee: Eastman Kodak Company, Rochester, NY (US)

( * ) Notice: Subject to any disclaimer, the term of this patent is extended or adjusted under 35 U.S.C. 154(b) by 648 days.

(21) Appl. No.: 10/225,598

(22) Filed: Aug. 22, 2002

(65) Prior Publication Data

US 2003/0058464 A1 Mar. 27, 2003

(30) Foreign Application Priority Data

Aug. 23, 2001 (GB) .................................. 0120489.0

(51) Int. Cl.
G06K 9/40 (2006.01)

(52) U.S. Cl. ...................... 382/274; 382/162; 382/286; 358/1.9; 358/518; 358/534

(58) Field of Classification Search .............. 382/162, 382/166, 167, 274, 286; 358/1.9, 518–521, 358/2.1, 3.24, 534, 536
See application file for complete search history.

(56) References Cited

U.S. PATENT DOCUMENTS

| 4,084,196 A | * | 4/1978 | Tisue et al. ................. 358/3.24 |
|---|---|---|---|
| 4,984,071 A | | 1/1991 | Yonezawa ..................... 358/80 |
| 5,062,058 A | | 10/1991 | Morikawa ..................... 364/521 |
| RE34,169 E | * | 1/1993 | Osburn et al. .............. 348/645 |
| 5,265,200 A | | 11/1993 | Edgar ........................... 395/131 |
| 5,467,412 A | * | 11/1995 | Capitant et al. ............. 382/167 |
| 5,754,222 A | * | 5/1998 | Daly et al. ................... 348/184 |
| 5,812,286 A | | 9/1998 | Lin .............................. 358/519 |
| 5,822,453 A | | 10/1998 | Lee et al. ..................... 382/169 |
| 6,184,915 B1 | * | 2/2001 | Atsumi et al. ............... 347/251 |
| 6,201,893 B1 | * | 3/2001 | Shiraiwa et al. ............. 382/167 |
| 6,424,740 B1 | | 7/2002 | Giorgianni et al. .......... 382/167 |
| 6,438,264 B1 | | 8/2002 | Gallagher et al. ........... 382/167 |
| 6,453,067 B1 | * | 9/2002 | Morgan et al. .............. 382/162 |

OTHER PUBLICATIONS

Reference Input/Output Medium Metric RGB Color Encodings (RIMM/ROMM RGB; Spaulding et al.; IS&T's 2000 PICS Conference; pp. 155-163, Mar. 26-29, 2000.
Appendix D: Adaptation of Digital Color Management; Giorgianni et al.; pp. 473.

* cited by examiner

Primary Examiner—Kanjibhai Patel
Assistant Examiner—Manav Seth
(74) Attorney, Agent, or Firm—Thomas J. Strouse

(57) ABSTRACT

A method of processing data from a digital image to enhance the neutral tonescale estimates a neutral offset, a neutral gain and a neutral gamma from the input data and uses these estimated values to transform the input image data.

82 Claims, 5 Drawing Sheets

TONE SCALE ADJUSTMENT OF DIGITAL IMAGES

CROSS REFERENCE TO RELATED APPLICATIONS

This is a U.S. original patent application which claims priority on Great Britain patent application No. 0120489.0 filed Aug. 23, 2001.

FIELD OF THE INVENTION

The invention relates to digital image processing, in particular to a method of enhancing the neutral tonescale of images that are encoded in a non logarithmic space.

BACKGROUND OF THE INVENTION

A typical digital imaging system captures an image and after various manipulations, both automatic and interactive, displays an output image on a monitor, or prints out a hard copy of the image. Digital manipulations include algorithms to restore image degradations or to enhance image quality, for example by correcting for image balance or tonescale problems or for improving sharpness or reducing image structure artifacts. This invention is concerned with correcting the tonescale of images which, for example, have been captured in sub-optimal illumination conditions, or which have suffered a subsequent tonescale degradation.

There are a number of algorithms that attempt digitally to correct the tonescale of poor quality images by means of operator intervention, for example in U.S. Pat. No. 5,062,058 which requires operator selection of highlight and shadowpoints. There are some circumstances in which user or operator intervention is appropriate, but generally this introduces a subjective variation in resulting image quality, along with reduced productivity.

Additionally, there are a number of algorithms that attempt to overcome these problems by automatically correcting the tonescale of poor quality images, such as 'Autolevels' in Adobe Photo-shop and U.S. Pat. No. 4,984,071. These generally include a linear tonescale correction in addition to a color balance correction, based on the determination of highlight and shadow points from a cumulative histogram. Hence the methods are based on gain and offset, and are typically aggressive, producing an unnatural tonescale with clipping in the shadow and highlight portions of the tonescale.

Other algorithms further modify the image tonescale by non-linear means. U.S. Pat. No. 5,812,286, for example, pins the 'black ' and 'white' point of each color and uses the median to modify a gamma value which provides a power-law transformation to the image.

U.S. Pat. No. 5,265,200 describes a method for automatic image saturation, gamma and exposure correction. The method disclosed for neutral tonescale transformation is implemented using a best-fit function, typically a second-order polynomial, which when applied to the image histogram, drives the histogram towards that of an 'ideal' image without artifacts that result from the capture process.

Both of these algorithms may, however, produce a tonescale that appears to be unnatural, and may produce either clipping or loss of detail in the shadow and highlight portions of the tonescale, or unacceptably low contrast in the central portion of the tonescale. Additionally, where there are large regions of the image that are relatively low in contrast or detail these areas will typically bias the analysis resulting in poor tonescale correction.

U.S. Pat. No. 5,822,453 describes a method for estimating and adjusting digital contrast in a logarithmic metric. This method computes a standard deviation for a histogram of sampled pixel values, more specifically those pixels that relate to high contrast (edge) information in the scene. The use of edge pixels minimizes effects of overemphasis of large flat regions or areas of texture in the scene. A target contrast is estimated by comparing the standard deviation with a predetermined contrast, and thereby produces a final reproduction tonescale transformation curve within pre-specified contrast limits. This method is logarithmically based and the algorithm is fairly highly tuned to that metric, making it inappropriate for the general non-logarithmic usage described earlier.

The invention aims to provide a method to digitally restore or enhance the neutral tonescale of images that does not depend on manual adjustments of brightness or contrast. The invention also aims to provide a method of restoring tonescale which provides a tonescale of natural appearance, and which minimizes clipping in the highlight portions of the image, whilst optimizing mid-tone contrast.

SUMMARY OF THE INVENTION

Analysis of the image provides a variety of parameters that are used to drive adaptively the tonescale transformation. These parameters include a neutral offset, a neutral gain and a neutral gamma (power law adjustment). The aim of these parameters is to provide a transformation to drive the statistics of each scene closer to the aim statistics averaged over all scenes encoded in the required metric.

According to the present invention there is provided a method of processing data from a digital image to enhance the neutral tonescale thereof, the method comprising the steps of;
  estimating a neutral offset from the input image data,
  estimating a neutral gain from the input image data,
  estimating a neutral gamma from the input image data,
  and using the estimated values to transform the input image data.

The invention further provides a method of processing data from a digital image to enhance the neutral tonescale thereof, the method comprising the steps of;
  estimating a neutral offset from input image data,
  estimating a neutral gain from the input image data,
  estimating a neutral gamma from the input image data,
  using the estimated values to calculate a shaper LUT, the shaper LUT being a function of the estimated values,
  creating a tonescale transformation LUT from the estimated values and the shaper LUT and
  using the tonescale transformation LUT to transform the input image data.

The invention yet further provides a method of processing data from a digital image to enhance the neutral tonescale thereof, the method comprising the steps of
  estimating a neutral offset from the input image data,
  estimating a neutral gain from the input image data,
  estimating a neutral gamma from the input image data,
  calculating a shaper LUT using the estimated values,
  creating a tonescale transformation LUT from the estimated values and the shaper LUT,
  calculating the first differential of the tonescale transformation LUT to produce a second LUT,
  performing a neutral and color difference rotation on the input image data, using the tonescale transformation LUT to perform a neutral transformation of the rotated input image data, using the second LUT to perform an adaptive saturation transformation of the rotated input image data, and rotating the transformed input data to provide the output image data.

The transformation may be applied analytically, using a power-law equation which is a function of the above variables, for example the output code value v'(x,y) for every input code value v(x,y) at pixel positions (i,j) in the image may be defined as:

$$v'(i,j)=((v(i,j)-\text{neutral offset}) \cdot \text{neutral gain})^{\wedge}\text{neutral gamma})$$

In one realization of the algorithm there is benefit in automatically generating a LUT to provide the transformation which includes shoulder shaping adaptive to the gain and gamma parameters, and which maintains the range of the image data to lie within that range defined by the metric.

The tonescale may be applied to each separation of a color image, but preferred performance is achieved by applying the tonescale to a neutral signal derived from the image, and to modify the chrominance components as described in U.S. Pat. No. 6,438,264, the contents of which are herein incorporated by reference. The neutral tonescale restoration may alternatively be applied to a low-pass filtered form of the image, and the complementary high-frequency image information subsequently added, so as to minimize the impact of the tonescale transformation on image noise.

This invention is based on a non-linear viewing adaptation model, that is related to the human visual system's adaptation to viewing conditions, including image adaptive highlight-shaping as a preferred feature, thus providing a more natural tonescale than the prior art. This preferred feature has the further advantage of providing a tonescale function in the highlight portions of the image that minimizes clipping, whilst optimizing, on an image-adaptive basis, the rendition of highlight detail. The highlight shaping also enables an optimum highlight tonescale without unduly impacting the required tonescale correction for the mid-tone and shadow portions of the image.

A further advantage of the method is to provide a method of tonescale restoration that includes analysis and transformation of the image such that the statistics of the image pixel values are explicitly related to the population aims of the required metric encoding (like sRGB or ROMM), with a rendering model such as is required in ROMM. This enables the algorithm to be easily modified, by means of parameter changes that correspond to the population aims in the required metric. The tonescale restoration can therefore be applied in the native metric of the image data, minimizing metric transformations and hence also minimizing implementation time and potential quantization artifacts. Alternatively the tonescale restoration may be applied in an optimum image metric for a particular system or set of restoration algorithms.

The image analysis makes use of averages of the upper and lower portions of the image histogram, thereby reducing impact of outliers, for example noise, dropout, scratches or dust, on the analysis. A further preferred feature is the use of selected image pixel values, for example those that occur at image edges, in the analysis thereby minimizing the effects of overemphasis of large flat regions or areas of low-contrast texture in the scene.

BRIEF DESCRIPTION OF THE DRAWINGS

The invention will now be described, by way of example, with reference to the accompanying drawings, in which.

DETAILED DESCRIPTION OF THE INVENTION

Figure 1:
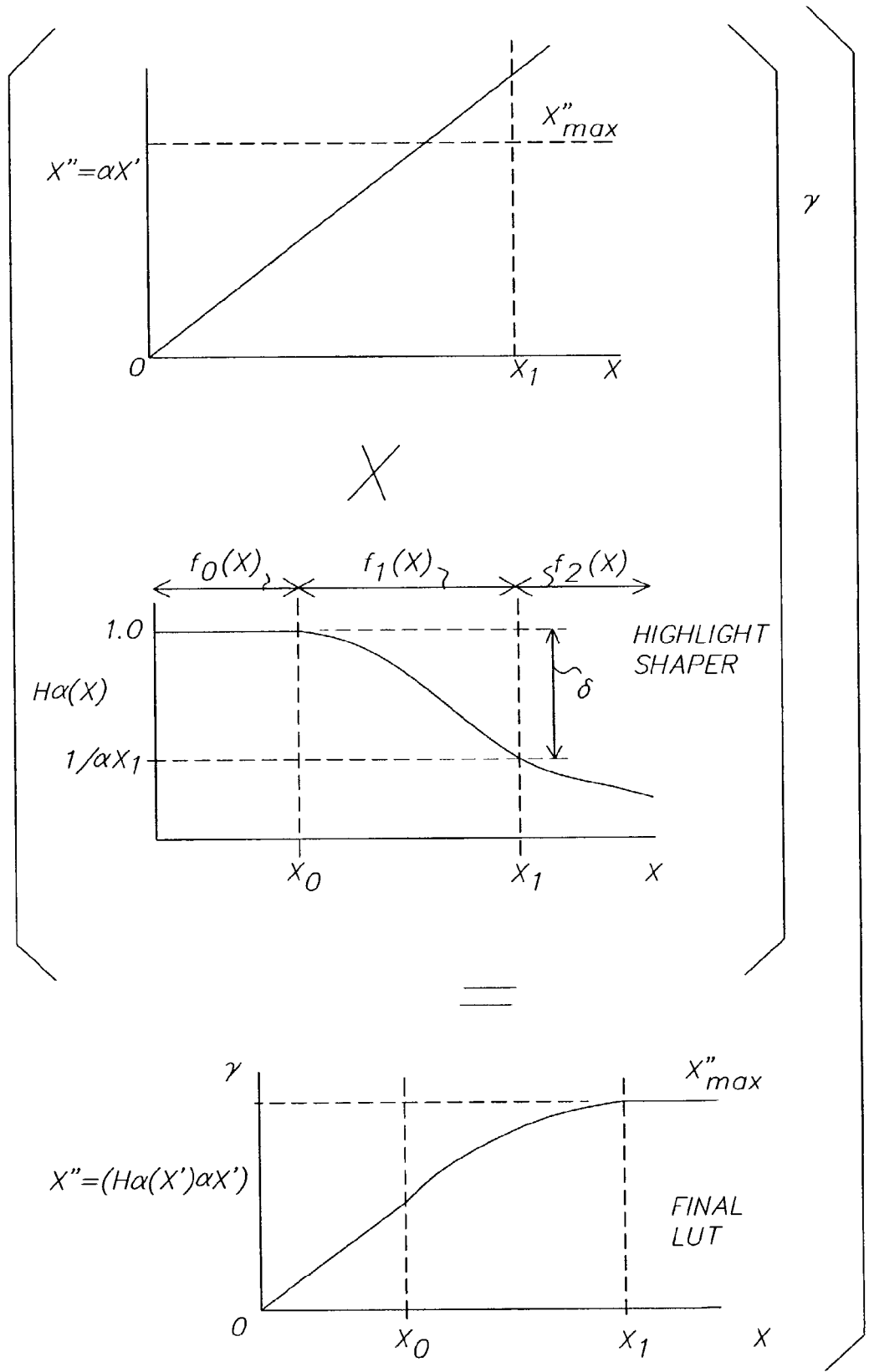
FIG. 1 illustrates the preferred method of creation of a tonescale transformation LUT, including a highlight shaper.

The invention provides a method to restore automatically or enhance the neutral tonescale of images that are encoded in a non-logarithmic metric (that is a linear or gamma space like sRGB or ROMM). The method does not depend on manual adjustments of brightness or contrast.

Although the principles of this invention can be employed for neutral tonescale correction or enhancement in any non-logarithmic space, this description and the reduction to practice relate to corrections applied in a ROMM encoding and to provide the reference rendering required by ROMM. The usage has been primarily as part of a digital algorithm for the restoration of faded images, in particular faded reversal images. The definition of the ROMM metric and encoding is described in "Reference Input/Output Medium Metric RGB Color Encodings (RIMM/ROMM RGB), presented by K. E. Spaulding, G. J. Woolfe, E. J. Giorgianni, at PICS 2000 Conference, Mar. 26–29, 2000, Portland Oreg. The principle of a fixed viewing adaptation model, referred to as Lateral-Brightness Adaptation, is described in Appendix D, pp473 of "Digital Color Management", E. J. Giorgianni & T. E. Madden. A simplification of the principles, and the inclusion of the model in a ROMM path for color reversal, is described in U.S. Pat. No. 6,424,740, "A method and means for producing high quality digital reflection prints from transparency images". In this application the simplified viewing adaptation model is defined as a set of transformations in tristimulus (linear) space:

$$X'=(\alpha X)^{\gamma}$$

$$Y'=(\alpha Y)^{\gamma}$$

$$Z'=(\alpha Z)^{\gamma} \qquad (1)$$

where the contrast adaptation to dark surround is modeled by $\gamma$, and the brightness adaptation modeled by $\alpha$. In U.S. Pat. No. 6,424,740 the values for $\alpha$ and $\gamma$ are optimized experimentally and the same values used for all images, that is $\alpha$ and $\gamma$ are not image-dependent variables. This application further teaches the need for the compression of highlight and shadow portions of the tonescale such that the tristimulus values of the transparency can be adequately represented in the final print:

$$X'=(H(X)L(X)\alpha X)^{\gamma}$$

$$Y'=(H(Y)L(Y)\alpha Y)^{\gamma}$$

$$Z'=(H(Z)L(Z)\alpha Z)^{\gamma} \qquad (2)$$

where H(Y) and L(Y) are highlight and lowlight shapers, each a function of Y, and designed for use with a particular α and γ. Typically H(X)=H(Y)=H(Z), and L(X)=L(Y)=L(Z).

The present invention takes several significant steps beyond the prior art. First, it broadens the concept of the viewing adaptation model for use as an image-adaptive tonescale restoration model, hence equations (1) may be rewritten in the form:

$$v'(i,j)=((v(i,j)-\text{neutral offset})\times\text{neutral gain})^{\text{neutral gamma}}$$

where v' and v are the restored and input code values for each pixel position (i,j) in an image encoded in a non-logarithmic (e.g. linear or gamma) metric. Secondly, it automatically estimates for each image, by means of image statistics, the neutral offset, neutral gain (related to α) and neutral gamma (related to γ) corrections required to transform the image towards the expected aim points averaged over all images defined in that metric. The correction could be applied analytically, as in the equation above. However, in one implementation of this method, the application of the gain and gamma corrections is achieved by means of a scene-adaptive lookup table that broadly takes the form of the viewing adaptation model, but where α, γ, and a neutral offset are scene dependent variables.

Thirdly, in the most general implementation, the method includes the highlight and lowlight shapers included in equations (2). In this invention α and γ are scene dependent variables and this introduces a difficulty, namely that an automatic method is required to generate the highlight and lowlight shapers, which also need to take different forms as a function of α and γ. U.S. Pat. No. 6,424,740 does not teach a form of the function for L(X) and H(X). Nor does it teach a method to automatically derive these shapers as a function of α and γ, since only one set of optimized (not scene-dependent) values for α and γ are required in the method it describes. The final significant step this invention takes over the prior art is the method to automatically generate a highlight shaper as a function of the other parameters of tonescale correction.

A method to automatically generate a low-light shaper is not described here—it was found experimentally to be of less significance than the highlight shaper—but a modification of the principles described here to generate a lowlight shaper would be obvious to a person skilled in the art.

The invention will now be described in more detail.

The description below provides detail of an example of a reduction to practice of this invention, namely to provide the neutral tonescale restoration component of a dyefade restoration algorithm.

While the use of the method in different image metrics such as linear, tristimulus, sRGB or ROMM will produce different values for offset, gamma and gain, these can be shown to be equivalent, and the resultant restoration transform will produce broadly similar image quality in the different metrics.

Figure 2:
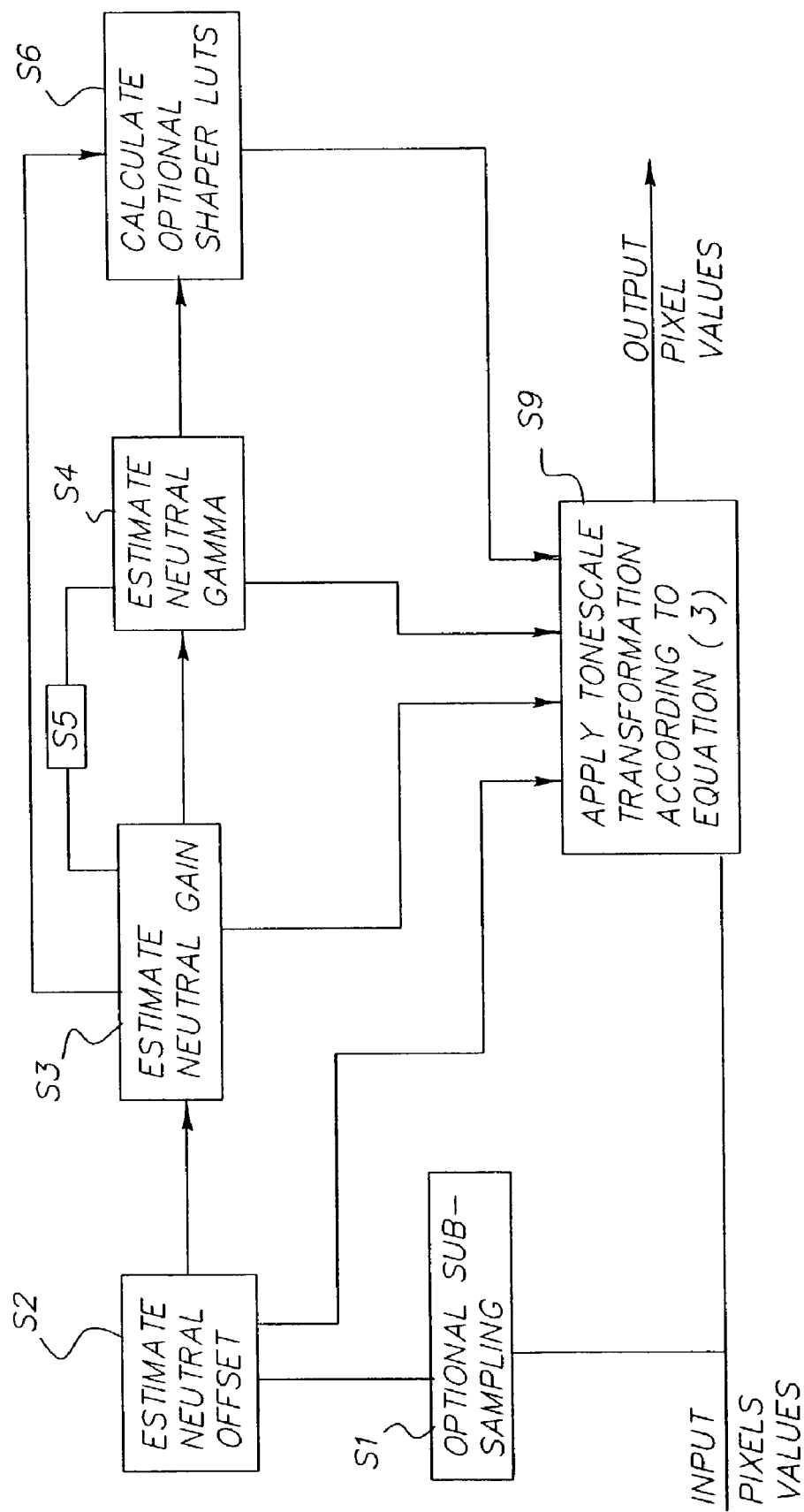
FIG. 2 is a flow chart illustrating a method according to the invention.
Figure 3:
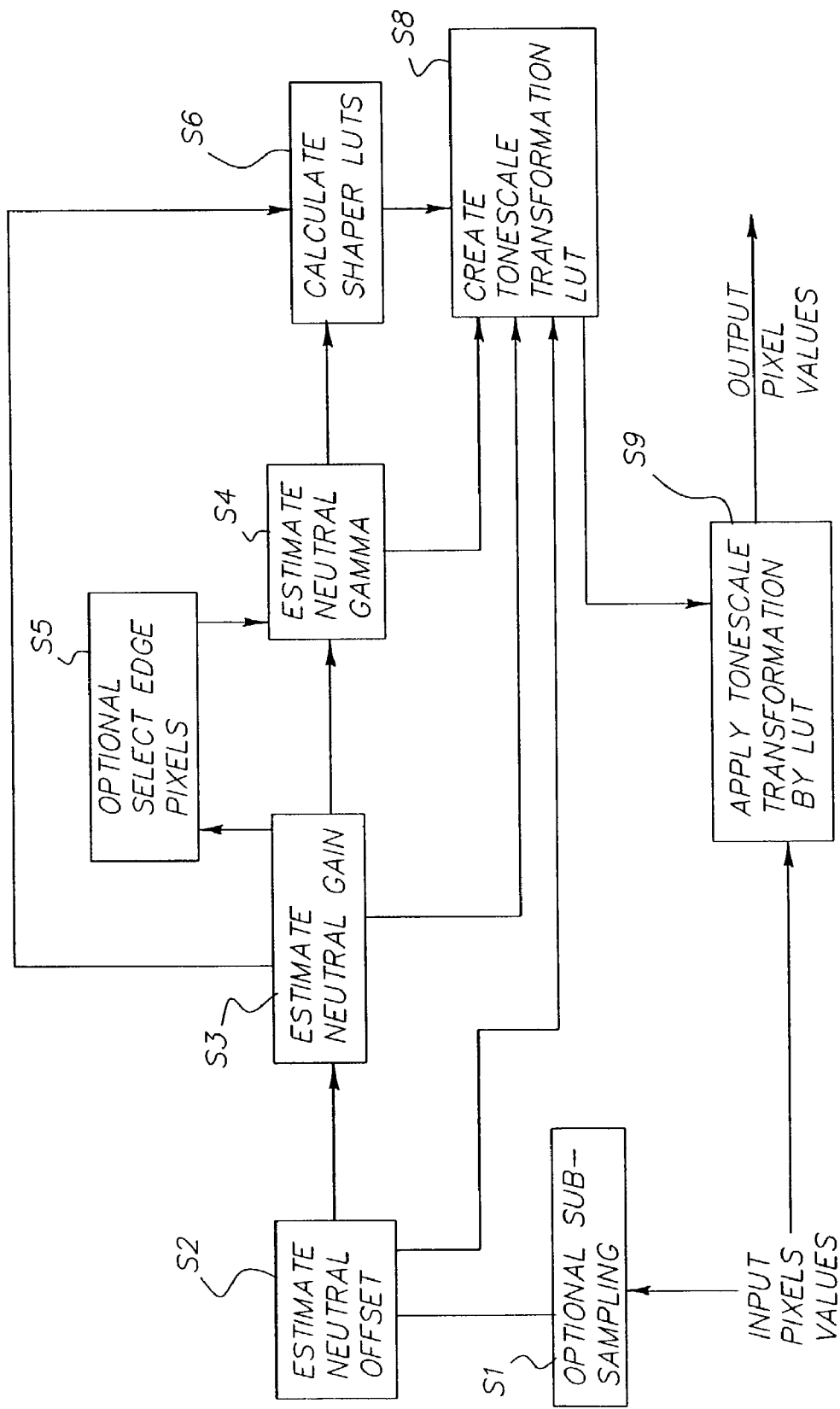
FIG. 3 is a flow chart illustrating a second method according to the invention.
Figure 4:
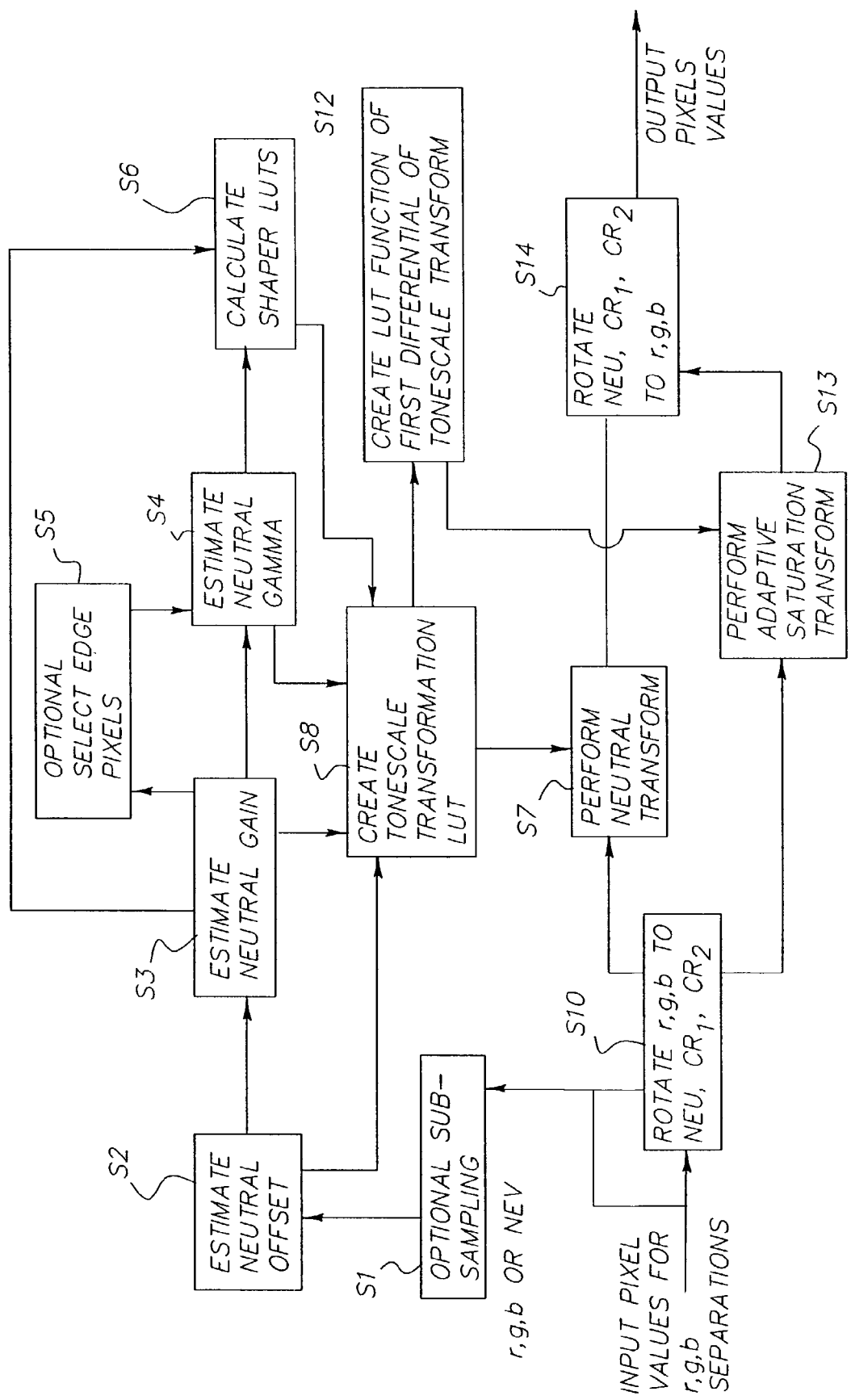
FIG. 4 is a flow chart illustrating a third method according to the invention.

FIGS. 2, 3 and 4 are flow charts illustrating methods of the invention. Where similar steps take place in the different methods the same reference number is used in each figure.

In step S1 the image data is presampled, typically 4:1 in each dimension.

Step S1 is optional, to achieve implementation efficiency. The image data may also be prefiltered or digitally filtered as part of the sub-sampling process to minimize the impact of aliasing artifacts on the image analysis.

In step S2 the neutral offset is estimated.

The method chosen to estimate the neutral offset is to calculate the means, or other arithmetic average, of a percentage of pixels having code values corresponding to the darkest portions of the scene, for each of the separation of the image. The percentage of pixels will typically be in the range 0.01 to 0.5%. The neutral offset is defined as a function of these means. In this implementation of the invention the neutral offset is given by the lowest value of the means scaled by an optimisable black offset correction factor.

The black offset correction factor will generally lie in the range 0.5–1.0. It has been found that a factor of approximately 0.95 produces optimum results in this application.

In step S3 the neutral gain is estimated.

The method chosen to estimate the neutral gain is similar to that for estimating the neutral offset as described above. The method chosen is to calculate the means, or other arithmetic average, of a percentage of pixels having code values corresponding to the lightest portions of the scene, for each of the separations of the image. The percentage of pixels will typically be in the range 0.01 to 0.5%. The neutral gain is defined as a function of these means, more specifically in this implementation:

$$\text{neutral gain} = \frac{((1-gcf).\text{maxmean}) + (gcf.\text{imscal})}{(\text{maxmean} - \text{neutral offset})}$$

where gcf is gain correction factor, an optimisable parameter; maxmean is the highest value of the separation means calculated above; and imscal describes the way in which the original image pixel values are scaled, i.e. imscal=1.0 for data scaled to lie in the range 1–0; imscal=255 for data in the range 0–255 and so on. Typically the gain correction factor lies in the range 0.25–1.0. It has been found that a factor of approximately 0.9 produces optimum results in this application.

In step S4 the neutral gamma is estimated.

To estimate the neutral gamma the pixel values in each of the image separations are firstly modified by the neutral gain and offset. This is done in accordance with the following equation:

$$v'(i,j)=(v(i,j)-\text{neutral offset})\cdot\text{neutral gain}$$

for each separation of the image.

A neutral signal n(i,j) is estimated by taking a weighted average at each pixel of the separation pixel values. In this implementation, the neutral value at each pixel is simply the sum of the separation values normalized by the number of separations, n=(r+g+b)/3.

The neutral image is scaled by dividing each pixel value by imscal, such that the pixel values lie in the range 0–1, and can therefore be transformed by a power function which effectively pins the black (pixel value=0.0) and white (pixel value=1.0) points in the tonescale. The mean, or other statistical average, is calculated of the neutral pixel values. In the simplest case the mean is calculated with equal weighting over all the neutral pixel values. However, only a portion of the neutral pixels may be selected in the calculation of the mean, and the average may be a weighted average. This selection takes place in step S5 and is more fully described below. The neutral gamma is defined as a function of this mean, more specifically in this implementation:

$$\text{neutral gamma} = \frac{\log(((1 - gamcf).meanlum) + (gamcf.aimpopmean))}{\log(meanlum)}$$

where gamcf is a gamma correction factor, an optimisable parameter; meanlum is the average of the neutral pixel values, scaled 0–1, as described above; and aimpopmean corresponds to the estimated tonescale centre of the image population encoded in the relevant metric. This would be around 18% in a scene reflectance metric, and estimated to be 0.4 for the ROMM metric scaled 0–1. Typically the gamma correction factor lies in the range 0.25–1.0. A factor of approximately 0.7 produces optimum results in this application.

In step S5 a selection of pixels is optionally chosen to estimate the neutral gamma.

The estimation accuracy of neutral gamma may be improved by taking the mean, or some other statistical average, of the image data that corresponds to high contrast (edge) information in the original scene. This has the advantage of eliminating from the statistics unwanted emphasis to flat or highly textured portions of the scene. This is similar to the method taught in U.S. Pat. No. 5,822,453.

There are many ways to implement the selection of the edge pixels, well known in the art, but in this implementation we choose to convolve a 3×3 weighted high-pass filter with a copy of the neutral image, and to measure the standard deviation of the resulting image. A threshold is set, based on that standard deviation, and at those pixels where the deviation of the high-pass filtered image from the mean (zero) is greater in amplitude than the threshold the corresponding pixel values from the full-band analysis image are selected for further statistics.

In this implementation the selection of pixel values corresponding to image edges is used only in the estimation of gamma. However it is possible to select pixel values corresponding to image edges also in the estimation of gain and offset.

The estimation accuracy may be further improved by weighting the statistics according to the importance of picture information. In the simplest form the pixel values in the central or near central portions of the image may be given a higher statistical weighting than those at the edge of the image. This method is more fully explained in co-pending application US Serial No. 10/225,762, having the same filing date as the present application. In a more sophisticated implementation the statistics could be weighted by scene content, in particular in conjunction with an algorithm to automatically detect the main feature or features of interest in a scene.

Step S6 is optional in the method shown in FIG. 2 and will be described later.

In step S9 the estimated values of the neutral offset, the neutral gain and the neutral gamma are used to transform the input image data and provide an output image.

The equations corresponding to the image transform of FIG. 2 can be written in their simplest form, without highlight and lowlight shapers, as:

$$x''(i,j) = [\alpha \cdot x'(i,j)]^\gamma$$

where $x'(i,j) = x(i,j) - \text{neutraloffset}$
  $\alpha$ = neutral gain
  $\gamma$ = neutral gamma Equations 2 above may also be expressed in the most general form in terms of the values estimated by the above analysis:

$$x''(i,j) = [H_\alpha(x'(i,j)) L_\alpha(x'(i,j)) \cdot \alpha \cdot x'(i,j)]^\gamma \quad (3)$$

or, alternatively, in their preferred form, including only the highlight shaper:

$$x''(i,j) = [H_\alpha(x'(i,j)) \cdot \alpha \cdot x'(i,j)]^\gamma$$

Here, for generality, variable x relates to the image metric, for example it equates to Y when the images are encoded in tristimulus. Furthermore, since the preferred implementation of the method is a neutral implementation, with appropriate modification to the chrominance or color difference signals as required, then x relates to a neutral signal, neu, derived from the color signals.

It will be understood by those skilled in the art that these transformations in their analytical form may be applied directly to the input pixel values to perform the tonescale transformation. However in the preferred embodiment a LUT is created, step S8, to enable the tonescale transformation to be performed. The tonescale transformation takes place in step S9 of FIG. 3. Step S8 is illustrated in FIG. 1.

A third embodiment of the invention is illustrated in FIG. 4 In step S10 of FIG. 4 a neutral and color difference rotation is performed on the input image data. There are many possible forms of a neutral and color difference rotation from r,g,b color records; for this implementation the following rotation was chosen:

$$\begin{pmatrix} neu \\ cr_1 \\ cr_2 \end{pmatrix} = \begin{pmatrix} 1/3 & 1/3 & 1/3 \\ -1/4 & 1/2 & -1/4 \\ -1/2 & 0 & 1/2 \end{pmatrix} \begin{pmatrix} r \\ g \\ b \end{pmatrix} \quad (4)$$

It will be understood that the method could alternatively be applied to each of the r,g,b color records separately.

The present invention also solves the problem of the adaptive highlight shaper, $H_\alpha$, corresponding to step S6. The adaptive highlight shaper compresses the dynamic range of the brightness surround function by means of a piecewise function as shown in FIG. 1. The function $H_\alpha$ has three sections: $f_0$ where no shaping is applied; $f_1$ which implements the shoulder shaping; and $f_2$, an optional section which implements a clipping of the function defined in equation 3 at the maximum value permitted by the encoding metric.

It is required that the function $H_\alpha$ should be continuous, and it is preferred that it should be smooth. Hence the shaping section $f_1$ may take any form that meets these requirements, and which also modifies the tonescale appropriately. In the preferred implementation $f_1$ takes a Gaussian form, of variance $\sigma^2$. The analytic description is as follows:

$$f_0(x) = 1 \text{ for all } 0 \leq x < x_0$$

$$f_1(x) = \delta \exp(-(x-x_0)^2/(2\sigma^2)) - \delta + 1 \text{ for all } x_0 \leq x < x_1$$

$$f_2(x) = 1/\alpha x \text{ for all } x_1 \leq x$$

At $x_0$ and $x_1$ it is required that the following conditions are held to provide continuity and smoothness:

$$f_1(x_1) = f_2(x_1) \quad (a)$$

$$df_1(x)/dx = df_2(x)/dx|_{x=x_1} \quad (b)$$

$$f_0(x_0)=f_1(x_0)=1.0 \quad (c)$$

$$df_0(x)/dx=df_1(x)/dx|_{x=x_0}=0.0 \quad (d)$$

The variable δ that satisfies condition (b) is given as:

$$\delta = \frac{\sigma^2}{\alpha x_1^2(x_1-x_0)}\exp((x_1-x_0)^2(2\sigma^2)) \quad (5)$$

Condition (a) can be expanded as follows:

$$\frac{1}{\alpha x_1} = \delta\exp(-(x_1-x_0)^2)/(2\sigma^2))-\delta+1$$

substituting δ for equation 5 gives:

$$\frac{1}{\alpha x_1} = \frac{\sigma^2}{\alpha x_1^2(x_1-x_0)}\{1-\exp((x_1-x_0)^2/(2\sigma^2))\}+1$$

Rearranging the equation above gives:

$$0 = \frac{\sigma^2}{x_1(x_1-x_0)}\{1-\exp((x_1-x_0)^2/(2\sigma^2))\}+\alpha x_1 - 1 \quad (6)$$

Root finding methods (such as Newton Raphson) can be applied to equation 6 in order to solve for τ for a given set of $x_1$, $x_0$ and α. If a solution for σ is successful then a value for δ can be found from equation 5 and a highlight shaper function, $H_\alpha(x)$ can be generated. In this implementation of the method intended for application in a linear metric (such as tristimulus) the values for $x_1$ and $x_0$ are chosen to be equal to the transmittances $10^{-0.65}$ and $10^{-0.07572}$ respectively; then for α=2.0, a solution for σ=0.409909 is obtained. Substituting $x_0=10^{-0.65}$, $x_1=10^{-0.07572}$, σ=0.409909 and α=2.0 in equation 5 gives a value for δ=0.59801. In the special case where the highlight shaper (generated with the above parameters) is multiplied by a brightness-surround function with α=2.0 and γ=0.9, the resulting shaped brightness-surround curve closely approximates the shape of the fixed viewing adaptation model described in U.S. Pat. No. 6,424,740.

When $x_1$ and σ are fixed at $x_1=10^{-0.007572}$ and σ=0.409909 then highlight shapers, $H_\alpha(x)$, can be generated automatically as a function of α as follows:

1. Solve equation 6 for $x_0$.
2. Find δ by substituting the value for $x_0$ found in step 1 above into equation 5.
3. Generate a piecewise shoulder shaper function using $x_0$ and δ calculated from steps (1) and (2) respectively.

Where this method is to be implemented directly in a non-linear metric, such as ROMM, the ROMM-equivalent values should be substituted. For example in the preferred implementation, the value $x_1$ is the ROMM value at which highlight clipping occurs, ROMM($10^{-0.07572}$)~0.9, for ROMM values scaled to lie in the range 0–1.

The neutral tonescale correction may be implemented by applying a transformation of the type described in equation 3 to a neutral separation of the image only, or alternatively to the r,g,b separations of an image. However, modifications to neutral tonescale also modify color saturation and the perception of noise and sharpness in an image.

U.S. Pat. No. 6,438,264 discloses a saturation transform adaptive to the neutral tonescale transform. This method, primarily based in a logarithmic metric, applies a transformation to color difference signals, for example $cr_1$ and $cr_2$ in equation 4 above, which is proportional to the first differential of the neutral tonescale transformation. In an implementation of the present invention the principles of the adaptive saturation transform are applied. This application takes place in step S12 of FIG. 4. Specifically the r,g,b separations, appropriately scaled, are rotated to neu, $cr_1$ and $cr_2$ as defined in equation 4. This rotation takes place in step S10 of FIG. 4. Neu, $cr_1$ and $cr_2$ are then transformed, either analytically or by means of look up tables, in steps S7(for neu) and S13 (for $cr_1$, $cr_2$) respectively, as follows:

$$neu''(i,j)=F(neu'(i,j))=[H_\alpha(neu'(i,j))L_\alpha(neu'(i,j))\cdot\alpha\cdot neu'(i,j)]^\gamma$$

where neu'(i,j)=neu(i,j)−neutraloffset $$cr'(i,j)=cr(i,j)[1+(\{dF(neu')/dneu'\}-1)\cdot stf]$$

for both $cr_1$ and $cr_2$, and where stf is a saturation transform factor, typically in the range 0.5–1.0.

In step S14 the neutral, $cr_1$ and $cr_2$ separations are rotated back to r,g,b color separations by means of a matrix which is the inverse of the matrix shown in equation 4.

In a further alternative implementation the transformations defined above are applied to low-pass filtered versions of neu, $cr_1$ and $cr_2$, and the complementary high-pass filtered neu, $cr_1$ and $cr_2$ are subsequently added to the transformed low-pass filtered separations, thus minimizing amplification of noise. Although the method as described above is primarily intended for use as an automatic method to restore or enhance the neutral tonescale of an image, equation 3 in conjunction with an appropriate $H_\alpha(x)$ may also be used with manually selected values for α, γ and the neutral offset.

Alternatively, in the case where a manual modification to image contrast is required, maintaining the overall image brightness, it is possible to rearrange equation 3 such that it provides values of α as a function of γ that produce an aim output from equation 3 for an input value corresponding to the average scene reflectance. Other, similar, variations of this principle will be obvious to those skilled in the art.

The principles of the method used in U.S. Pat. No. 5,822,453, herein incorporated by reference, could be implemented as a post-process to the present invention to achieve second order tonescale corrections to those implementable by an offset, gain and gamma, with appropriate high-light and low-light shaping, in a non-logarithmic space. Examples of such second order corrections include those required where a scene has multiple illuminants, or for example back-lit or flash in the face scenes.

This invention, or parts of it, may be incorporated in a broader algorithm for digital image restoration. In one realization the method to estimate the neutral gamma parameter is used in co-pending application GB 0120491.6, having the same filing date as the present application. In an additional realization the method may be used as an extension of the viewing adaptation model used to render images scanned from reversal to be appropriate for ROMM. (see U.S. Pat. No. 6,424,740). In a further realization the method forms a part of an algorithm for the automatic digital restoration of faded images. U.S. Ser. No. 09/650,422 describes a method for the restoration of faded reversal images that depends on the estimate of a relative black point. The application teaches that the dyefade restoration method is further improved by the addition of a neutral tonescale restoration step within the algorithm, but does not teach how that may be achieved. This invention provides the method for that component part of the algorithm.

The present invention, either as a stand-alone algorithm or a component part of a broader algorithm may be included in a range of applications in which digital images are input, images captured digitally, or film images scanned; digital image processing performed; and digital images output, stored or printed. These applications include digital processing laboratories (mini and wholesale), kiosks, internet fulfillment, and commercial or home computer systems with appropriate peripherals, digital cameras and so on.

In the above description, preferred embodiments of the present invention were described in terms that would ordinarily be implemented as a software program. Those skilled in the art will readily recognize that the equivalent of such software may also be constructed in hardware. Because image manipulation algorithms and systems are well known, the present description has been directed in particular to algorithms and systems forming part of, or co-operating more directly with, the system and method in accordance with the present invention. Other aspects of such algorithms and systems, and hardware and/or software for producing and otherwise processing the image signals involved therewith, not specifically shown or described herein, may be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 5:
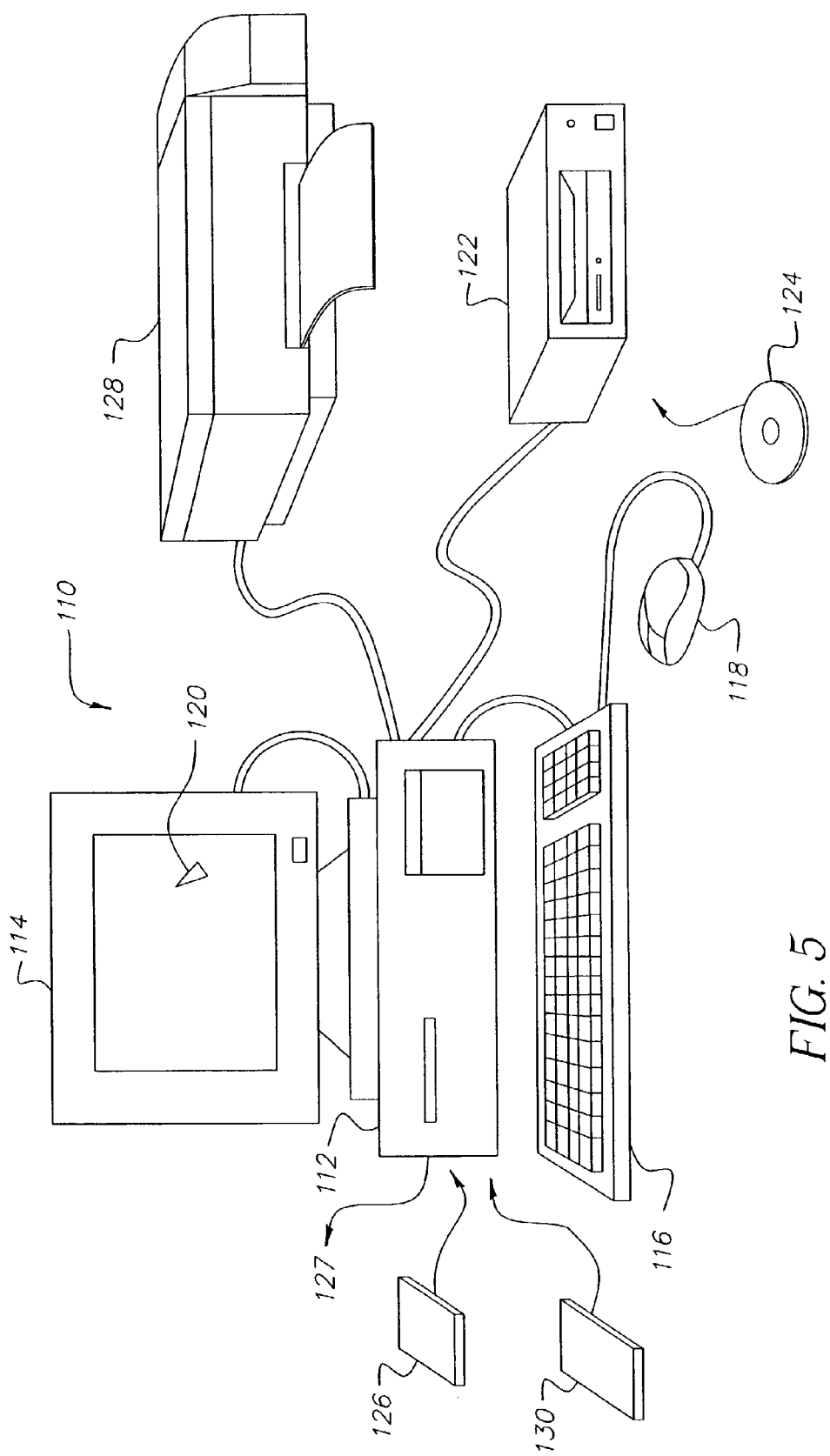
FIG. 5 is a perspective view of a computer system for implementing the present invention.

Referring to FIG. 5, there is illustrated a computer system 110 for implementing the present invention. Although the computer system 110 is shown for the purpose of illustrating a preferred embodiment, the present invention is not limited to the computer system 110 shown, but may be used on any electronic processing system. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera (not shown) or a scanner (not shown). In accordance with the invention, the algorithm may be stored in any of the storage devices heretofore mentioned and applied to images in order to restore or enhance the neutral tonescale of images.

PARTS LIST 110 computer system
112 unit
114 display
116 keyboard
120 selector
122 CD ROM
124 compact disk
126 floppy disk
127 network connection
128 printer
130 PC card

What is claimed is:

1. A method of processing data from a digital image to enhance the neutral tonescale thereof, the method comprising the steps of;
   estimating a neutral offset from the input image data,
   estimating a neutral gain from the input image data,
   estimating a neutral gamma from the input image data,
      wherein the estimated neutral offset, neutral gain and neutral gamma values are used in the following equation:

$$x''(i,j) = [H_\alpha(x'(i,j)) \cdot \alpha \cdot x'(i,j)]^\gamma$$

where $x'(i,j) = x(i,j) - \text{neutraloffset}$
$\alpha = $ neutral gain
$\gamma = $ neutral gamma
$H_\alpha = $ image adaptive highlight shaper and used to transform the input image data.

2. A method according to claim 1 wherein the function $H_\alpha$ has at least two sections, a first section where no shaping is applied and a second section which implements the shoulder shaping.

3. A method according to claim 2 wherein the second section takes a Gaussian form.

4. A method according to claim 3 wherein the Gaussian form is image adaptive, dependent on the value $\alpha$.

5. A method of processing data from a digital image to enhance the neutral tonescale thereof, the method comprising the steps of:
estimating a neutral offset from the input image data,
estimating a neutral gain from the input image data,
estimating a neutral gamma from the input image data,
wherein the estimated neutral offset, neutral gain and neutral gamma values are used in the following equation:

$$x''(i,j)=[H_\alpha(x'(i,j))L_\alpha(x'(i,j))\cdot\alpha\cdot x'(i,j)]^\gamma$$

where $x''(i,j)=x(i,j)-\text{neutraloffset}$
$\alpha$=neutral gain
$\gamma$=neutral gamma
$H_\alpha$=image adaptive highlight shaper
$L_\alpha$=image adaptive lowlight shaper and
$x''(i,j)$ is used to transform the input image data.

6. A method according to claim 5 wherein the function $H_\alpha$ has at least two sections, a first section where no shaping is applied and a second section which implements the shoulder shaping.

7. A method according to claim 6 wherein the second section takes a Gaussian form.

8. A method according to claim 7 wherein the Gaussian form is image adaptive, dependent on the value $\alpha$.

9. A method according to claim 1 wherein the input image data is sub-sampled before the neutral offset, neutral gain and neutral gamma are estimated.

10. A method according to claim 9 wherein the image data is sub-sampled by 4:1 in each dimension.

11. A method according to claim 9 wherein the image data is pre-filtered to reduce the bandwidth appropriately for sub-sampling.

12. A method according to claim 1 wherein the neutral offset is estimated by calculating the averages of a percentage of pixels having code values corresponding to the darkest portion of the image, for each separation of the input image, the neutral offset being a function of these averages.

13. A method according to claim 12 wherein the percentage of pixels used is in the range of 0.01% to 0.5%.

14. A method according to claim 12 wherein the neutral offset is given by the lowest value of the averages scaled by an optimisable black offset correction factor.

15. A method according to claim 14 wherein the offset correction factor lies in the range of 0.5 to 1.0.

16. A method according to claim 1 wherein the neutral gain is estimated by calculating the averages of a percentage of pixels having code values corresponding to the lightest portions of the image, for each separation of the input image, the neutral gain being a function of these averages.

17. A method according to claim 16 wherein the neutral gain is defined by the following function:

$$\text{neutral gain} = \frac{((1-gcf).\text{maxmean}) + (gcf.\text{imscal})}{(\text{maxmean} - \text{neutral offset})}$$

where gcf=gain correction factor maxmean is the highest value of the averages calculated imscal is a scaling value corresponding to the scaling of the image pixel values.

18. A method according to claim 17 wherein the gain correction factor lies in the range of 0.25 and 1.

19. A method according to claim 1 wherein the neutral gamma is estimated using the following equation;

$$\text{neutral gamma} = \frac{\log(((1-gamcf).\text{meanlum}) + (gamcf.\text{aimpopmean}))}{\log(\text{meanlum})}$$

where gamcf is a gamma correction factor;
meanlum is the average value of $n(i,j)$, a neutral signal scaled to lie in the range 0–1 and calculated from the pixel values from the image separations each transformed according to $v'(i,j)=(v(i,j)-\text{neutral offset})\cdot\text{neutral gain}$; and
aimpopmean corresponds to the estimated tonescale centre of the image population encoded in the relevant metric.

20. A method according to claim 19 wherein the gamma correction factor lies in the range of 0.25 to 1.

21. A method according to claim 19 wherein the neutral gamma is estimated using the average of the image data that corresponds to edge information in the original image.

22. A method according to claim 21 wherein the neutral offset and neutral gain are also estimated using the average of the input image data that corresponds to edge information of the original image.

23. A method according to claim 1 wherein pixel values in the centre of the image are given a higher statistical weighting than pixel values at the edge of the image.

24. A method according to claim 5 wherein pixel values in the centre of the image are given a higher statistical weighting than pixel values at the edge of the image.

25. A method according to claim 1 wherein pixel values are weighted by scene content.

26. A method according to claim 5 wherein pixel values are weighted by scene content.

27. A method according to claim 1 wherein red, green and blue components of the input image are used.

28. A method of processing data from a digital image to enhance the neutral tonescale thereof, the method comprising the steps of;
estimating a neutral offset from input image data,
estimating a neutral gain from the input image data,
estimating a neutral gamma from the input image data,
using the estimated neutral offset, neutral gain and neutral gamma values to calculate a shaper LUT, the shaper LUT being a function of the estimated values,
creating a tonescale transformation LUT from the estimated values and the shaper LUT; and
using the tonescale transformation LUT to transform the input image data.

29. A method according to claim 28 applied to images encoded in a non logarithmic space.

30. A method according to claim 28 wherein the estimated values are used in the following equation:

$$x''(i,j)=[\alpha\cdot x'(i,j)]^\gamma$$

where $x'(i,j)=x(i,j)-\text{neutraloffset}$
$\alpha$=neutral gain
$\gamma$=neutral gamma.

31. A method according to claim 28 wherein the estimated values are used in the following equation:

$$x''(i,j)=[H_\alpha(x'(i,j))\cdot\alpha\cdot x'(i,j)]^\gamma$$

where x'(i,j)=x(i,j)−neutraloffset
α=neutral gain
γ=neutral gamma
$H_\alpha$=image adaptive highlight shaper.

32. A method according to claim 31 wherein the function $H_\alpha$ has at least two sections, a first section where no shaping is applied and a second section which implements the shoulder shaping.

33. A method according to claim 32 wherein the second section takes a Gaussian form.

34. A method according to claim 33 wherein the Gaussian form is image adaptive, dependent on the value α.

35. A method according to claim 28 wherein the estimated values are used in the following equation:

$$x''(i,j)=[H_\alpha(x'(i,j))L_\alpha(x'(i,j))\cdot\alpha\cdot x'(i,j)]^\gamma$$

where x'(i,j)=x(i,j)−neutraloffset
α=neutral gain
γ=neutral gamma
$H_\alpha$=image adaptive highlight shaper
$L_\alpha$=image adaptive lowlight shaper.

36. A method according to claim 35 wherein the function $H_\alpha$ has at least two sections, a first section where no shaping is applied and a second section which implements the shoulder shaping.

37. A method according to claim 36 wherein the second section takes a Gaussian form.

38. A method according to claim 37 wherein the Gaussian form is image adaptive, dependent on the value α.

39. A method according to claim 28 wherein the input image data is sub-sampled before the neutral offset, neutral gain and neutral gamma are estimated.

40. A method according to claim 39 wherein the image data is sub-sampled by 4:1 in each dimension.

41. A method according to claim 39 wherein the image data is pre-filtered to reduce the bandwidth appropriately for sub-sampling.

42. A method according to claim 28 wherein the neutral offset is estimated by calculating the averages of a percentage of pixels having code values corresponding to the darkest portion of the image, for each separation of the input image, the neutral offset being a function of these averages.

43. A method according to claim 42 wherein the percentage of pixels used is in the range of 0.01% to 0.5%.

44. A method according to claim 42 wherein the neutral offset is given by the lowest value of the averages scaled by an optimisable black offset correction factor.

45. A method according to claim 44 wherein the offset correction factor lies in the range of 0.5 to 1.0.

46. A method according to claim 28 wherein the neutral gain is estimated by calculating the averages of a percentage of pixels having code values corresponding to the lightest portions of the image, for each separation of the input image, the neutral gain being a function of these averages.

47. A method according to claim 46 wherein the neutral gain is defined by the following function:

$$\text{neutral gain} = \frac{((1-gcf).\text{max}mean)+(gcf.imscal)}{(\text{max}mean - \text{neutral offset})}$$

where gcf=gain correction factor maxmean is the highest value of the averages calculated imscal is a scaling value corresponding to the scaling of the image pixel values.

48. A method according to claim 47 wherein the gain correction factor lies in the range of 0.25 and 1.

49. A method according to claim 28 wherein the neutral gamma is estimated using the following equation;

$$\text{neutral gamma} = \frac{\log(((1-gamcf).meanlum)+(gamcf.aimpopmean))}{\log(meanlum)}$$

where gamcf is a gamma correction factor;
meanlum is the average value of n(i,j), a neutral signal scaled to lie in the range 0–1 and calculated from the pixel values from the image separations each transformed according to v'(i,j)=(v(i,j)−neutral offset)·neutral gain; and
aimpopmean corresponds to the estimated tonescale centre of the image population encoded in the relevant metric.

50. A method according to claim 49 wherein the gamma correction factor lies in the range of 0.25 to 1.

51. A method according to claim 49 wherein the neutral gamma is estimated using the average of the image data that corresponds to edge information in the original image.

52. A method according to claim 51 wherein the neutral offset and neutral gain are also estimated using the average of the input image data that corresponds to edge information of the original image.

53. A method according to claim 30 wherein pixel values in the centre of the image are given a higher statistical weighting than pixel values at the edge of the image.

54. A method according to claim 31 wherein pixel values in the centre of the image are given a higher statistical weighting than pixel values at the edge of the image.

55. A method according to claim 35 wherein pixel values in the centre of the image are given a higher statistical weighting than pixel values at the edge of the image.

56. A method according to claim 30 wherein pixel values are weighted by scene content.

57. A method according to claim 31 wherein pixel values are weighted by scene content.

58. A method according to claim 35 wherein pixel values are weighted by scene content.

59. A method according to claim 28 wherein red, green and blue components of the input image are used.

60. A method of processing data from a digital image to enhance the neutral tonescale thereof, the method comprising the steps of
estimating a neutral offset from the input image data,
estimating a neutral gain from the input image data,
estimating a neutral gamma from the input image data,
calculating a shaper LUT using the estimated neutral offset, neutral gain and neutral gamma values,
creating a tonescale transformation LUT from the estimated neutral offset, neutral gain and neutral gamma values and the shaper LUT,
calculating the first differential of the tonescale transformation LUT to produce a second LUT,
performing a neutral and color difference rotation on the input image data,
using the tonescale transformation LUT to perform a neutral transformation of the rotated input image data,
using the second LUT to perform an adaptive saturation transformation of the rotated input image data, and rotating the transformed input data to provide the output image data.

61. A method according to claim 60 applied to images encoded in a non logarithmic space.

62. A method as claimed in claim 60 wherein the neutral transformation used takes the form of the following equation;

$$neu''(i,j)=F(neu'(i,j))=[H_\alpha(neu'(i,j))L_\alpha(neu'(i,j))\cdot\alpha\cdot neu'(i,j)]^\gamma$$

where neu'(i,j)=neu(i,j)−neutraloffset.

63. A method as claimed in claim 60 wherein the adaptive saturation transformation takes the form of the following equation;

$$cr'(i,j)=cr(i,j)[1+(\{dF(neu')/dneu'\}-1)\cdot stf]$$

for both $cr_1$ and $cr_2$, where stf is the saturation transform factor.

64. A method according to claim 63 wherein the saturation transform factor is in the range of 0.5 to 1.

65. A method according to claim 60 wherein the input image data is rotated in accordance with the following equation.

66. A method according to claim 60 wherein neu, $cr_1$ and $cr_2$ are low pass filtered prior to being transformed, and complementary high pass filtered values of neu, $cr_1$ and $cr_2$ added to the transformed low pass filtered separations.

67. A method according to claim 60 wherein the input image data is subsampled before the neutral offset, neutral gain and neutral gamma are estimated.

68. A method according to claim 67 wherein the image data is subsampled by 4:1 in each dimension.

69. A method according to claim 60 wherein the neutral offset, neutral gain and neutral gamma are estimated using high contrast edge information in the input image.

70. A method according to claim 60 wherein only neutral components of the input image are used.

71. A method of processing digital images wherein at least part of the method of processing data from the image is a method according to claim 1.

72. A method of processing digital images wherein at least part of the method of processing data from the image is a method according to claim 28.

73. A method of processing digital images wherein at least part of the method of processing data from the image is a method according to claim 60.

74. A computer program product for enhancing the neutral tonescale of a digital image comprising a computer readable storage medium having a computer program stored thereon for performing the steps of
estimating a neutral offset from the input image data,
estimating a neutral gain from the input image data,
estimating a neutral gamma from the input image data; and
using the estimated neutral offset, neutral gain and neutral gamma values in the following equation:

$$x''(i,j)=[H_\alpha(x'(i,j))\cdot\alpha\cdot x'(i,j)]^\gamma$$

where x'(i,j)=x(i,j)−neutraloffset
α=neutral gain
γ=neutral gamma
$H_\alpha$=image adaptive highlight shaper and
x" (i,j) is used to transform the input image data.

75. A computer program product for enhancing the neutral tonescale of a digital image comprising a computer readable storage medium having a computer program stored thereon for performing the steps of estimating a neutral offset from the input image data,
estimating a neutral gain from the input image data,
estimating a neutral gamma from the input image data,
using the estimated neutral offset, neutral gain and neutral gamma values to calculate a shaper LUT, the shaper LUT being a function of the estimated values,
creating a tonescale transformation LUT from the estimated values and the shaper LUT; and
using the tonescale transformation LUT to transform the input image data.

76. A computer program product for enhancing the neutral tonescale of a digital image comprising a computer readable storage medium having a computer program stored thereon for performing the steps of estimating a neutral offset from the input image data,
estimating a neutral gain from the input image data,
estimating a neutral gamma from the input image data,
calculating a shaper LUT using the estimated neutral offset, neutral gain and neutral gamma values,
creating a tonescale transformation LUT from the estimated neutral offset, neutral gain and neutral gamma values and the shaper LUT,
calculating the first differential of the tonescale transformation LUT to produce a second LUT,
performing a neutral and color difference rotation on the input image data,
using the tonescale transformation LUT to perform a neutral transformation of the rotated input image data,
using the second LUT to perform an adaptive saturation transformation of the rotated input image data; and
rotating the transformed input data to provide the output image data.

77. A device for processing data from a digital image to enhance the neutral tonescale thereof, the apparatus including;
means for estimating a neutral offset from input image data,
means for estimating a neutral gain from the input image data,
means for estimating a neutral gamma from the input image data; and
means for using the estimated neutral offset, neutral gain and neutral gamma values in the following equation $$x''(i,j)=[H_\alpha(x'(i,j))\cdot\alpha\cdot x'(i,j)]^\gamma$$

where x'(i,j)=x(i,j)−neutraloffset
α=neutral gain
γ=neutral gamma
$H_\alpha$=image adaptive highlight shaper and
x"(i,j) is used to transform the input image data.

78. A device for processing data from a digital image to enhance the neutral tonescale thereof, the apparatus including;
means for estimating a neutral offset from input image data,
means for estimating a neutral gain from the input image data,
means for estimating a neutral gamma from the input image data,
means for using the estimated neutral offset, neutral gain and neutral gamma values to calculate a shaper LUT, the shaper LUT being a function of the estimated values,
means for creating a tonescale transformation LUT from the estimated values and the shaper LUT; and means for using the tonescale transformation LUT to transform the input image data.

79. A device for processing data from a digital image to enhance the neutral tonescale thereof, the apparatus including;

means for estimating a neutral offset from the input image data, means for estimating a neutral gain from the input image data, means for estimating a neutral gamma from the input image data, means for calculating a shaper LUT using the estimated neutral offset, neutral gain and neutral gamma values, means for creating a tonescale transformation LUT from the estimated neutral offset, neutral gain and neutral gamma values and the shaper LUT, means for calculating the first differential of the tonescale transformation LUT to produce a second LUT, means for performing a neutral and color difference rotation on the input image data, means for using the tonescale transformation LUT to perform a neutral transformation of the rotated input image data, means for using the second LUT to perform an adaptive saturation transformation of the rotated input image data, and means for rotating the transformed input data to provide the output image data.

80. A system for the processing of digital image data wherein a digital image is input, the image is processed and the processed image stored and/or output, at least part of the processing of the image comprising a method according to claim 1.

81. A system for the processing of digital image data wherein a digital image is input, the image is processed and the processed image stored and/or output, at least part of the processing of the image comprising a method according to claim 28.

82. A system for the processing of digital image data wherein a digital image is input, the image is processed and the processed image stored and/or output, at least part of the processing of the image comprising a method according to claim 60.

* * * * *

UNITED STATES PATENT AND TRADEMARK OFFICE
CERTIFICATE OF CORRECTION

PATENT NO. : 7,068,853 B2 Page 1 of 1
APPLICATION NO. : 10/225598
DATED : June 27, 2006
INVENTOR(S) : Jennifer C. Loveridge et al.

It is certified that error appears in the above-identified patent and that said Letters Patent is hereby corrected as shown below:

Column 12, line 66, claim 1    --x"(i,j) is-- was omitted, should be inserted after and Signed and Sealed this Ninth Day of January, 2007

JON W. DUDAS
*Director of the United States Patent and Trademark Office*